(12) United States Patent
Vite Cadena

(10) Patent No.: US 11,124,144 B2
(45) Date of Patent: Sep. 21, 2021

(54) MOUNTING SYSTEMS FOR VEHICLE ACCESSORIES

(71) Applicant: Nissan North America, Inc., Franklin, TN (US)

(72) Inventor: Manuel Alejandro Vite Cadena, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 121 days.

(21) Appl. No.: 16/696,424

(22) Filed: Nov. 26, 2019

(65) Prior Publication Data

US 2021/0155187 A1    May 27, 2021

(51) Int. Cl.
*B60R 21/02*    (2006.01)
*B60R 5/04*    (2006.01)

(52) U.S. Cl.
CPC .............. *B60R 21/026* (2013.01); *B60R 5/04* (2013.01)

(58) Field of Classification Search
CPC ................................ B60R 21/026; B60R 5/04
USPC ....................................................... 296/24.44
See application file for complete search history.

(56) References Cited

U.S. PATENT DOCUMENTS

| 6,012,753 | A | 1/2000 | Ordoyne et al. |
| 6,467,828 | B1 | 10/2002 | Grydbeck et al. |
| 6,669,259 | B2 | 12/2003 | Murray et al. |
| 7,287,796 | B2 | 10/2007 | Coles et al. |
| 7,478,858 | B1 | 1/2009 | Brun |
| 10,800,371 | B2 * | 10/2020 | Marini ...................... F16B 2/08 |
| 2011/0042989 | A1 | 2/2011 | Heller |
| 2020/0055436 | A1 * | 2/2020 | Garcia Sanchez ....... B60N 2/91 |

FOREIGN PATENT DOCUMENTS

| EP | 0776791 | A2 | 6/1997 |
| EP | 0787627 | A1 | 8/1997 |
| EP | 1155922 | A2 | 11/2001 |
| EP | 1298014 | A2 | 4/2003 |
| FR | 2699875 | A1 | 7/1994 |
| FR | 2951121 | A3 | 4/2011 |
| JP | 2018150000 | A | 9/2018 |
| WO | 2014/129074 | A1 | 8/2014 |

* cited by examiner

*Primary Examiner* — Pinel E Romain
(74) *Attorney, Agent, or Firm* — Young Basile Hanlon & MacFarlane, P.C.

(57) ABSTRACT

A vehicle is disclosed that includes an accessory separating a cargo area from a passenger seating area and a mounting system that is configured to support the accessory. The mounting system includes a first bracket that is secured to a body panel of the vehicle and a second bracket that is connected to the first bracket. The first bracket is positioned between the body panel and a headliner of the vehicle such that the first bracket is concealed by the headliner. The second bracket is configured for connection to the accessory and extends through an opening in the headliner such that a first section of the second bracket is concealed by the headliner and a second section of the second bracket is exposed from the headliner, whereby the headliner is movable relative to and about the second bracket upon deployment of an airbag so as to reduce interference therewith.

20 Claims, 5 Drawing Sheets

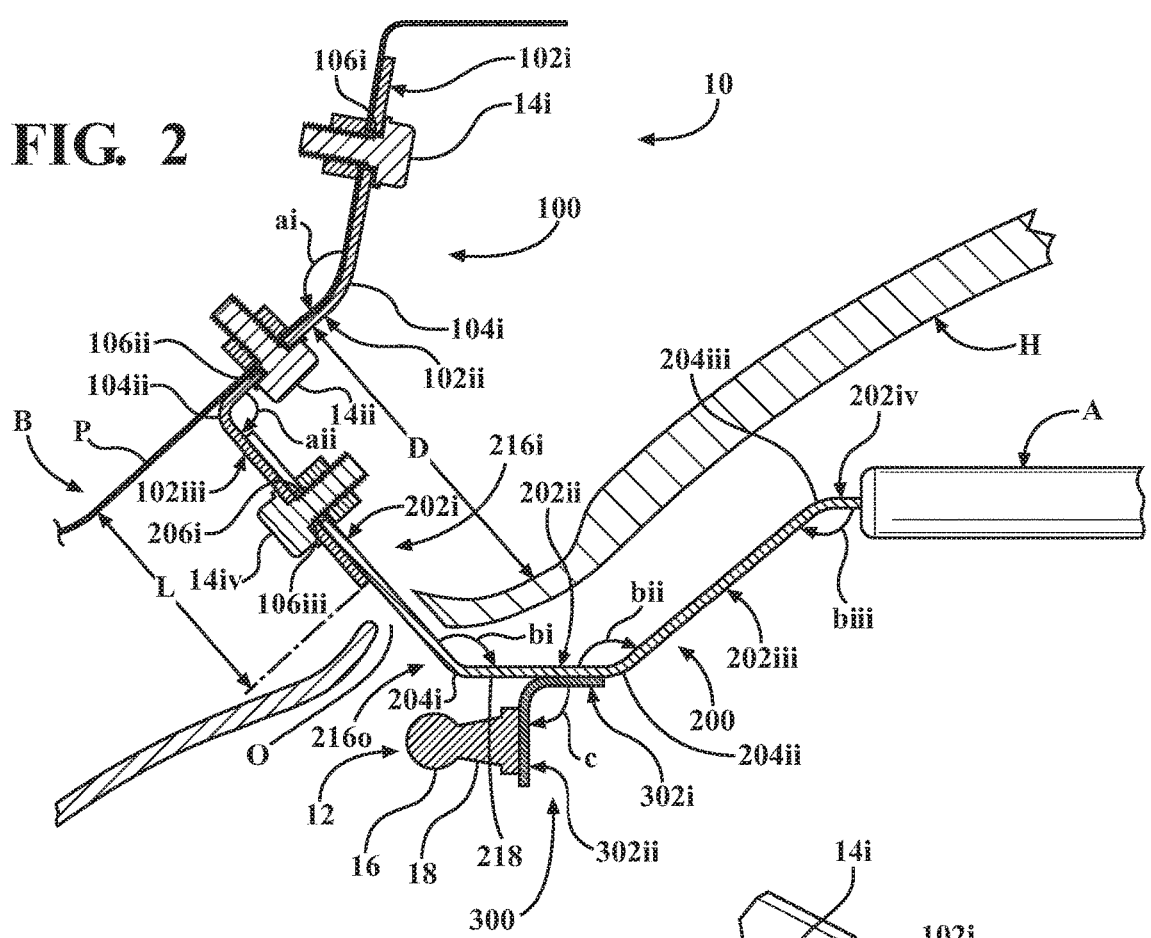
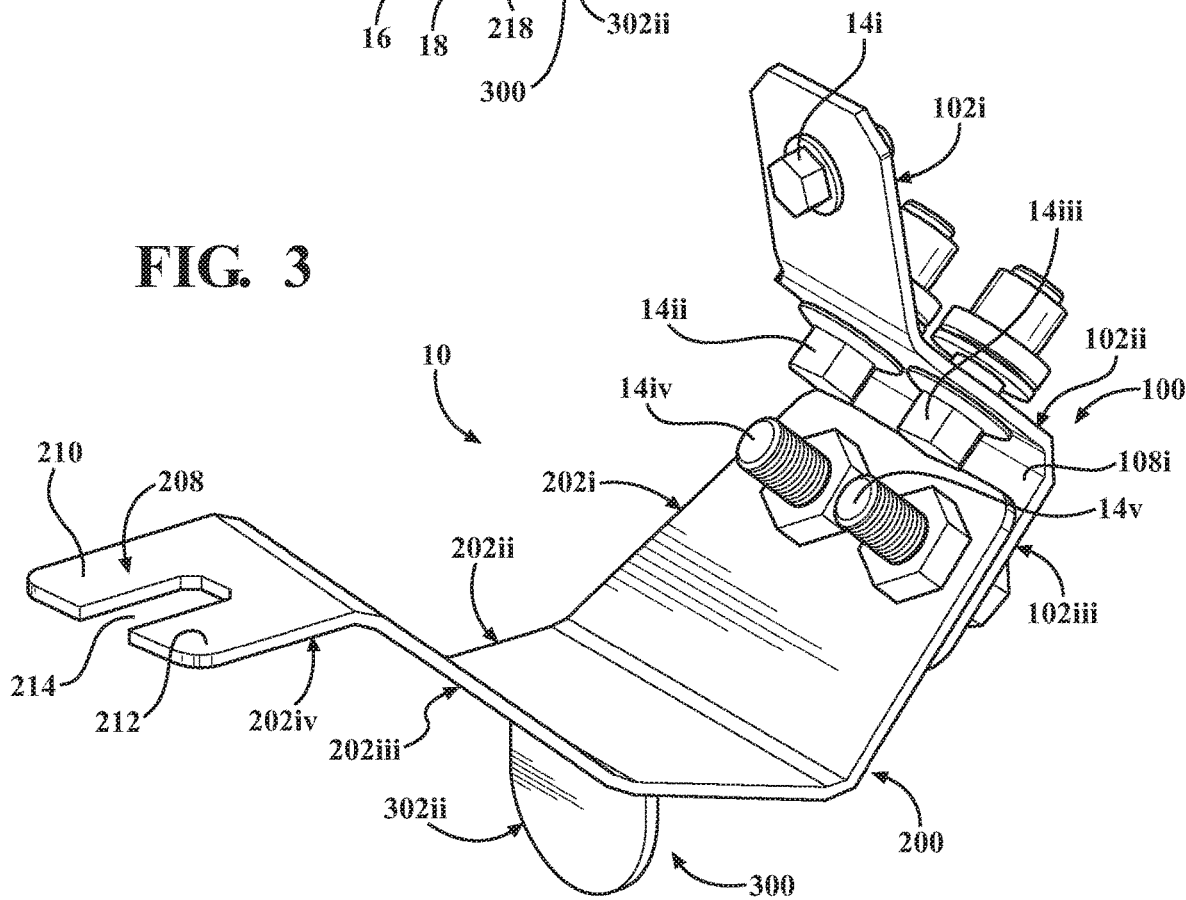

MOUNTING SYSTEMS FOR VEHICLE ACCESSORIES

TECHNICAL FIELD

The present disclosure relates to mounting systems and structures for vehicle accessories and, more specifically, to mounting systems and structures for a divider used to separate internal areas of vehicles from one another (e.g., passenger seating areas and cargo areas).

BACKGROUND

Oftentimes, accessories are installed in a vehicle after purchase. For example, a pet divider may be installed to restrict pet movement within a vehicle and confine pets to the cargo area positioned rearwardly of the passenger seating area. The mounting systems currently used to install such accessories, however, may interfere with (curtain) air bag deployment, may result in damage to the vehicle's headliner upon deployment, and are often unattractive in that they generally include covers and/or gap fillers to conceal bolts (or other such fixation members) and spacing between components of the vehicle.

The present disclosure addresses these issues by providing improved mounting systems for accessories in vehicles.

SUMMARY

In one aspect of the present disclosure, a vehicle is disclosed that includes an accessory separating a cargo area from a passenger seating area and a mounting system that is configured to support the accessory. The mounting system includes a first bracket that is secured to a body panel of the vehicle and a second bracket that is connected to the first bracket. The first bracket is positioned between the body panel of the vehicle and a headliner of the vehicle such that the first bracket is concealed by the headliner. The second bracket is configured for connection to the accessory and extends through an opening in the headliner such that a first section of the second bracket is concealed by the headliner and a second section of the second bracket is exposed from the headliner, whereby the headliner is movable relative to and about the second bracket upon deployment of an airbag so as to reduce interference with deployment of the airbag.

In certain embodiments, the second bracket may be superimposed on the first bracket.

In certain embodiments, the first bracket may include a first leg and a second leg that extends from the first leg in generally orthogonal relation.

In certain embodiments, the first bracket may be generally L-shaped in configuration.

In certain embodiments, the first bracket may further include a third leg that extends from the second leg in generally orthogonal relation.

In certain embodiments, the second bracket may be connected to the second leg of the first bracket.

In certain embodiments, the second bracket may be connected to the third leg of the first bracket.

In certain embodiments, the second bracket may include a first leg; a second leg that extends from the first leg at a first obtuse angle; a third leg that extends from the second leg at a second obtuse angle; and a fourth leg that extends from the third leg at a third obtuse angle.

In certain embodiments, the fourth leg may include a forked end that is configured for connection to the accessory.

In certain embodiments, the second bracket may be configured to support a pivot member to allow for pivotable movement of the accessory relative to the mounting system.

In certain embodiments, the second bracket may further include a flange that extends from the second leg.

In certain embodiments, the pivot member may be connected to the flange.

In certain embodiments, the mounting system may further include a third bracket that is secured to the second leg of the second bracket.

In certain embodiments, the pivot member may be connected to the third bracket.

In another aspect of the present disclosure, a vehicle is disclosed that includes an accessory separating a cargo area from a passenger seating area and a mounting system that is configured to support the accessory. The mounting system includes a first bracket that is secured to a body panel of the vehicle and a second bracket that is connected to the first bracket. The first bracket is positioned between the body panel of the vehicle and a headliner of the vehicle. The first bracket extends through an opening in the headliner such that the headliner is movable relative to and about the first bracket upon deployment of an airbag so as to reduce interference with deployment of the airbag and includes: a first leg; a second leg that extends from the first leg in generally orthogonal relation; and a third leg that extends from the second leg at an obtuse angle. The second bracket is configured for connection to the accessory and includes a first leg; a second leg that extends from the first leg; and a third leg that extends from the second leg.

In certain embodiments, the first leg of the second bracket may be connected to the third leg of the first bracket.

In certain embodiments, the second leg of the second bracket may extend from the first leg of the second bracket at a first obtuse angle, and the third leg of the second bracket may extend from the second leg of the second bracket at a second obtuse angle.

In certain embodiments, the second leg of the second bracket may be connected to the third leg of the first bracket.

In certain embodiments, the second leg of the second bracket may extend in generally orthogonal relation to each of the first leg of the second bracket and the third leg of the second bracket.

In another aspect of the present disclosure, a method of connecting an accessory to a vehicle such that the accessory separates a cargo area from a passenger seating area is disclosed. The method includes connecting a first bracket to a body panel of the vehicle such that the first bracket is concealed by a headliner of the vehicle; connecting a second bracket to the first bracket such that the second bracket extends through an opening in the headliner, whereby the headliner is movable relative to and about the second bracket upon deployment of an airbag so as to reduce interference with deployment of the airbag; and connecting the accessory to the second bracket.

In certain embodiments, connecting the second bracket to the first bracket may include connecting a first leg of the second bracket to a second leg of the first bracket, wherein the first and second legs of the first bracket extend in generally orthogonal relation such that the first bracket is generally L-shaped in configuration.

In certain embodiments, connecting the second bracket to the first bracket may include connecting the second bracket to a second leg or to a third leg of the first bracket, wherein the second leg extends from a first leg in generally orthogonal relation and the third leg extends from the second leg in generally orthogonal relation.

BRIEF DESCRIPTION OF THE DRAWINGS

According to common practice, the various features of the drawings may not be to scale, and may be arbitrarily expanded or reduced for clarity.

FIG. 2 is a schematic view of the accessory shown mounted within the vehicle via the mounting system.

FIG. 3 is a side, perspective view of the mounting system.

DETAILED DESCRIPTION

The present disclosure describes various embodiments and implementations of mounting systems and structures for vehicle accessories, as well as corresponding methods of installation and use. The mounting systems described herein include a first bracket that is connected to a body panel of the vehicle (which may refer to any suitable structural component or member) and a second bracket that is configured for connection to the first bracket and an accessory for the vehicle, such as, for example, a pet divider. In certain embodiments, the first bracket is concealed behind a headliner of the vehicle, as are the mechanical fasteners used to connect the first and second brackets together and secure the mounting system to the vehicle, and the second bracket extends through an opening in the headliner. Extension of the second bracket through the opening in the headliner allows for deflection of the headliner upon deployment of a (curtain) airbag module and movement of the headliner relative to the mounting system, thereby reducing (if not entirely eliminating) resistance to (and interference with) deployment of the (curtain) airbag module and facilitating less substantial deformation of the headliner (when compared to known systems).

Figure 1:
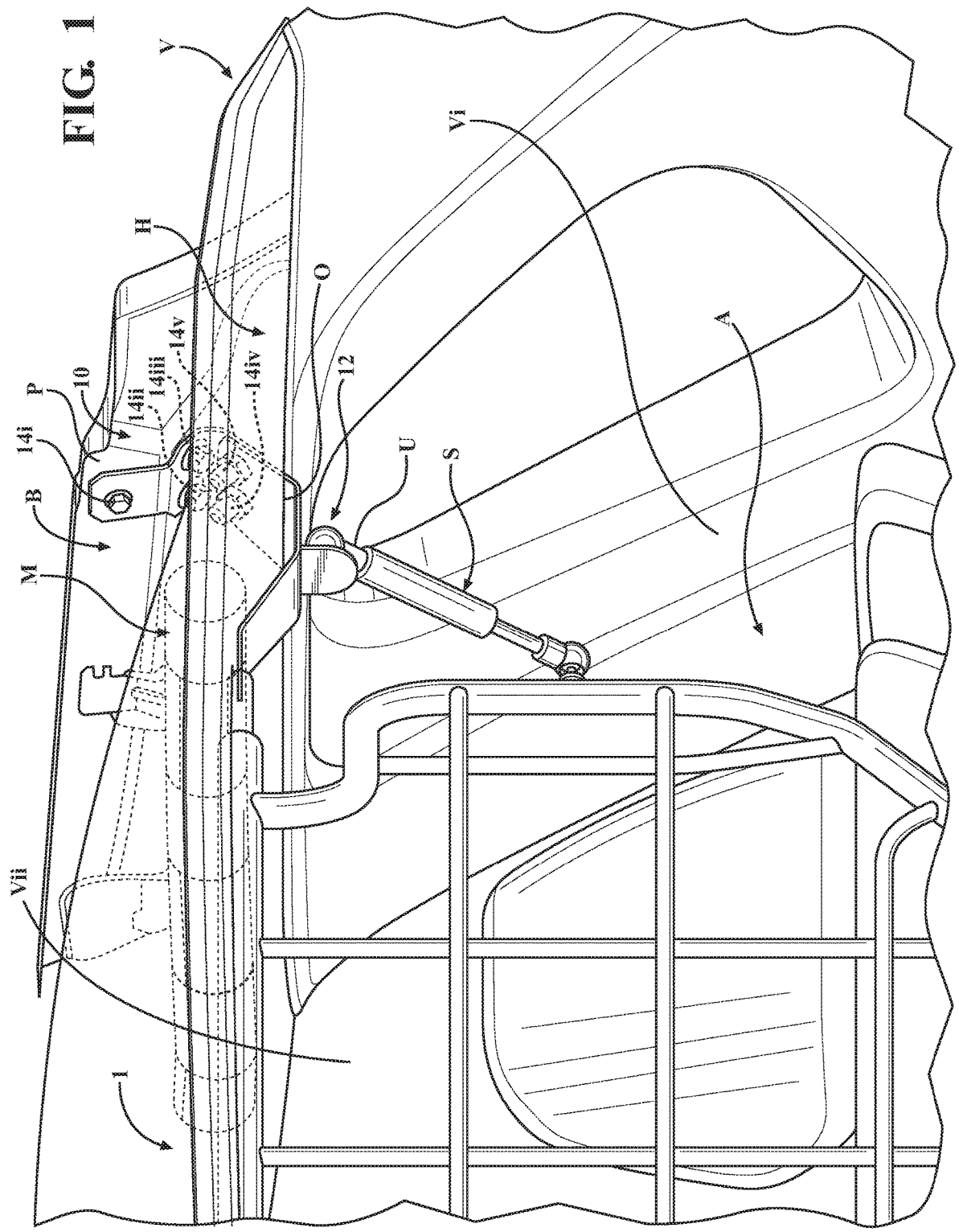
FIG. 1 is a partial, rear, perspective view of an accessory (e.g., a pet divider) shown mounted within a vehicle via a mounting system that is the subject of the present disclosure.

With reference to FIG. 1, an accessory A is shown installed in a vehicle V, which is supported by a mounting system 10 that is the subject of the present disclosure. The accessory A is located rearwardly of a (curtain) airbag module M and is configured to separate a first area Vi (e.g., a cargo area) of the vehicle V from a second area Vii (e.g., a passenger seating area) of the vehicle V. Although generally illustrated as a pet divider that is configured to restrict pet movement within the vehicle V (e.g., so as to confine pets to the first area Vi), it should be appreciated that the mounting system 10 may find applicability to a variety of other vehicle accessories.

The accessory A is repositionable between a first (use, active) position, in which the accessory A is positioned in a generally vertical orientation, as seen in FIG. 1, and a second (storage, inactive) position, in which the accessory A is positioned in a generally non-vertical (e.g., horizontal) orientation. To facilitate repositioning of the accessory A between the first and second positions, in the illustrated embodiment, the accessory A is pivotably connected to one or more supports S (e.g., pneumatic struts).

With reference now to FIGS. 2 and 3 as well, the mounting system 10 will be discussed. The mounting system 10 includes a first bracket 100 that is configured for connection to a body panel B of the vehicle V (e.g., to a rear pillar P, a roof rail, or other such suitable structural component or member), a second bracket 200 that is configured for connection to the first bracket 100, and a third bracket 300 that supports a pivot member 12 to allow for connection of the mounting system 10 to the support(s) S. More specifically, in the illustrated embodiment, the first bracket 100 is connected to the vehicle V via one or more mechanical fasteners 14 (e.g., bolts), and the second bracket 200 is connected to the first bracket 100 via one or more mechanical fasteners 14. While the first bracket 100 is shown as being connected to the vehicle V via three mechanical fasteners 14$i$, 14$ii$, 14$iii$ and the second bracket 200 is shown as being connected to the first bracket 100 via two mechanical fasteners 14$iv$, 14$v$, it should be appreciated that the particular number of mechanical fasteners 14 utilized to assemble the mounting system 10 and connect the mounting system 10 to the vehicle V may be varied without departing from the scope of the present disclosure (e.g., depending upon the particular configuration of the accessory A, the particular model or style of the vehicle V, etc.).

The first bracket 100 is unitarily (e.g., monolithically) formed and may include (e.g., may be formed from) any suitable material or combination of materials, such as, for example, metallic material(s), plastic material(s), polymeric material(s), carbon fiber, etc. It is also envisioned that the first bracket 100 may be formed through any suitable method of manufacture, such as, for example, stamping, machining, 3-D printing, etc.

The first bracket 100 includes a first leg 102$i$; a second leg 102$ii$ that extends from the first leg 102$i$ so as to define a first (obtuse) angle $a_i$ in correspondence with a contour defined by the body panel B of the vehicle V (e.g., by the rear pillar P); and a third leg 102$iii$ that extends from the second leg 102$ii$ so as to define a second angle $a_{ii}$. In the illustrated embodiment, the first bracket 100 is configured such that the first angle $a_i$ lies substantially within the range of approximately 110° to approximately 160° (e.g., approximately 135°) and the second angle $a_{ii}$ lies substantially within the range of approximately 70° to approximately 110° (e.g., approximately 90°), whereby the third leg 102$iii$ extends transversely (e.g., generally orthogonally) in relation to the second leg 102$ii$ and the first bracket 100 is generally L-shaped in configuration. It should be appreciated, however, that the particular configuration of the first bracket 100 and the relative orientations of the legs 102$i$-102$iii$ may be varied in alternate embodiments without departing from the scope of the present disclosure (e.g., depending upon the particular configuration of the accessory A, the particular model or style of the vehicle V, etc.). As such, embodiments in which the angles $a_i$, $a_{ii}$ may lie outside the ranges identified are also envisioned herein.

As illustrated throughout the figures, the first bracket 100 includes a series of radiused bends 104 at the points of intersection between the legs 102$i$-102$iii$ so as to eliminate any pointed corners. More specifically, in the illustrated embodiment, the legs 102*i*, 102*ii* intersect at a first bend 104*i* and the legs 102*ii*, 102*iii* intersect at a second bend 104*ii*. However, embodiments in which one or more of the bends 104 may include a generally rectilinear configuration (e.g., depending upon the particular configuration of the vehicle V, the contour of the body panel B, etc.) would not be beyond the scope of the present disclosure.

Each of the legs 102*i*-102*ii* is generally linear in configuration and includes one or more openings 106 that are configured to receive the mechanical fasteners 14. More specifically, the respective first and second legs 102*i*, 102*ii* include one or more openings 106*i*, 106*ii* that are configured to receive the mechanical fasteners 14*i*, 14*ii*, 14*iii* so as to fixedly connect the first bracket 100 to the vehicle V, and the third leg 102*iii* includes one or more openings 106*iii* that are configured to receive the mechanical fasteners 14*iv*, 14*v* so as to fixedly connect the second bracket 200 to the first bracket 100. As seen in FIG. 2, the third leg 102*iii* defines a length L that is less than the distance D between the headliner H and the body panel B of the vehicle V such that the first bracket 100 is positioned between the body panel B and the headliner H and is entirely concealed by the headliner H.

The second bracket 200 is unitarily (e.g., monolithically) formed and may include (e.g., may be formed from) any suitable material or combination of materials, such as, for example, metallic material(s), plastic(s), polymeric material(s), carbon fiber, etc. Like the first bracket 100, it is envisioned that the second bracket 200 may be formed through any suitable method of manufacture, such as, for example, stamping, machining, 3-D printing, etc.

The second bracket 200 includes a first leg 202*i*; a second leg 202*ii* that extends from the first leg 202*i* so as to define a first (obtuse) angle b*i*; a third leg 202*iii* that extends from the second leg 202*ii* so as to define a second (obtuse) angle b*ii*; and a fourth leg 202*iv* that extends from the third leg 202*iii* so as to define a third (obtuse) angle b*iii*. In the illustrated embodiment, the second bracket 200 is configured such that the respective first, second, and third angles b*i*-b*iii* each lie substantially within the range of approximately 110° to approximately 160° (e.g., approximately 135°), whereby the respective second and fourth legs 202*ii*, 202*iv* extend in generally parallel relation. As such, embodiments in which the angles b*i*-b*iii* are identical (or substantially similar) are envisioned herein, as illustrated in FIGS. 1-3. It should be appreciated, however, that the particular configuration of the second bracket 200 and the relative orientations of the legs 202*i*-202*iv* may be varied in alternate embodiments without departing from the scope of the present disclosure (e.g., depending upon the particular configuration of the accessory A, the particular model or style of the vehicle V, etc.). As such, embodiments in which the angles b*i*-b*iii* may lie outside the ranges identified are also envisioned herein.

As illustrated in FIGS. 1-3, the second bracket 200 includes a series of radiused bends 204 at the points of intersection between the legs 202*i*, 202*ii*, 202*iii*, 202*iv* so as to eliminate any pointed corners. More specifically, in the illustrated embodiment, the legs 202*i*, 202*ii* intersect at a first bend 204*i*, the legs 202*ii*, 202*iii* intersect at a second bend 204*ii*, and the legs 202*iii*, 202*iv* intersect at a third bend 204*iii*. It is envisioned that the curvature of the bends 204 (e.g., the bend 204*i*) may facilitate movement of the headliner H relative to (and about) the second bracket 200 upon deployment of the (curtain) airbag module M, as described in further detail below. However, embodiments in which one or more of the bends 204 may include a generally rectilinear configuration (e.g., depending upon the particular configuration of the vehicle V, the contour of the body panel B, etc.) would not be beyond the scope of the present disclosure.

The first leg 202*i* is generally linear in configuration and includes a pair of openings 206*i* that are configured to receive the mechanical fasteners 14*iv*, 14*v* so as to fixedly connect the second bracket 200 to the first bracket 100. The respective second and third legs 202*ii*, 202*iii* are also generally linear in configuration, but are devoid of any such openings. The fourth leg 202*iv* is generally linear in configuration and defines an end region 208 (FIG. 3) that is configured to facilitate support of (and connection to) the accessory A. For example, in the illustrated embodiment, the end region 208 of the fourth leg 202*iv* is forked in configuration and includes a pair of arms 210, 212 defining a linear gap 214 therebetween. It should be appreciated, however, that the particular configuration of the end region 208 may be altered in various embodiments without departing from the scope of the present disclosure (e.g., depending upon the particular configuration, style, etc., of the accessory A).

As seen in FIGS. 2 and 3, the first leg 202*i* of the second bracket 200 is positioned in adjacent, contacting relation to the third leg 102*iii* of the first bracket 100. More specifically, the first leg 202*i* of the second bracket 200 is superimposed on an inner surface 108*i* (FIG. 3) of the third leg 102*iii* of the first bracket 100 and extends through an opening O (FIGS. 1, 2) in the headliner H such that a first (inner) section 216*i* (FIG. 2) of the first leg 202*i* is concealed by the headliner H and a second (outer) section 216*o* of the first leg 102*i* is exposed from (visible through) the headliner H. The particular configurations of the brackets 100, 200 thus allow each of the mechanical fasteners 14 to be concealed by the headliner H, thereby improving the overall aesthetic appearance of the mounting system 10 (when compared to known systems and structures).

The opening O in the headliner H is configured in correspondence with the second bracket 200 and, thus, in the illustrated embodiment, includes a generally rectangular configuration. It should be appreciated, however, that the particular configuration of the opening O in the headliner H may be varied depending upon the particular configuration of the second bracket 200. As such, embodiments are envisioned herein in which the opening O may include alternate configurations.

As indicated above, the third bracket 300 supports the pivot member 12, which is configured for connection to an (upper) end U (FIG. 1) of the support(s) S to allow for pivoting of the accessory A between the first and second positions. Although shown as including a ball component 16 (FIG. 2) that is supported by a stem 18 in the illustrated embodiment, it should be appreciated that the particular configuration of the pivot member 12 may be varied in alternate embodiments of the disclosure to allow for compatibility and use of the mounting system 10 with a variety of accessories A and support(s) S. It is envisioned that the pivot member 12 may be secured (or otherwise connected) to the third bracket 300 in any suitable manner, such as, for example, via welding, through the use of an adhesive or one or more mechanical fasteners, etc.

The third bracket 300 is unitarily (e.g., monolithically) formed and may include (e.g., may be formed from) any suitable material or combination of materials, such as, for example, metallic material(s), plastic(s), polymeric material(s), carbon fiber, etc. It is also envisioned that the first bracket 100 may be formed through any suitable method of manufacture, such as, for example, stamping, machining, 3-D printing, etc.

The third bracket 300 includes a generally linear first leg 302*i* and a generally linear second leg 302*ii* that extends from the first leg 302*i* so as to define an angle c. In the illustrated embodiment, the third bracket 300 is configured such that the angle c lies substantially within the range of approximately 70° to approximately 110° (e.g., approximately 90°), whereby the second leg 302*ii* of the third bracket 300 extends transversely (e.g., generally orthogonally) in relation to the second leg 302*ii* of the second bracket 200. It should be appreciated, however, that the particular configuration of the third bracket 300 and the relative orientations of the legs 302*i*, 302*ii* may be varied in alternate embodiments without departing from the scope of the present disclosure (e.g., depending upon the particular configuration of the accessory A, the particular model or style of the vehicle V, etc.). As such, embodiments in which the angle c may lie outside the range identified are also envisioned herein.

In the illustrated embodiment, the first leg 302*i* of the third bracket 300 is positioned in adjacent, contacting relation to the second leg 202*ii* of the second bracket 200. More specifically, the first leg 302*i* of the third bracket 300 is superimposed on an outer surface 218 of the second leg 202*ii* of the second bracket 200 and is fixedly connected thereto, such as, for example, via welding, through the use of an adhesive or one or more mechanical fasteners, etc. Alternatively, in certain embodiments of the disclosure, it is envisioned that the third bracket 300 may be eliminated and that the second leg 302*ii* may be included on (e.g., formed unitarily with) the second bracket 200 as a flange that extends from the second leg 202*ii* in the manner described herein.

With continued reference to FIGS. 1-3, installation and use of the mounting system 10 will be discussed. To connect the mounting system 10 to the vehicle V, the fastener 14*i* is inserted into the opening(s) 106*i* in the first leg 102*i* of the first bracket 100 and the fasteners 14*ii*, 14*iii* are inserted into the opening(s) 106*ii* in the second leg 102*ii* of the first bracket 100. The fasteners 14*i*, 14*ii*, 14*iii* are then tightened to the body panel B of the vehicle V (e.g., to the rear pillar P) to secure the first bracket 100 in place.

Either prior or subsequent to connection of the first bracket 100 to the vehicle V, the second bracket 200 is connected to the first bracket 100 and the second bracket 200 is positioned within the opening O in the headliner H such that the first bracket 100 is concealed by the headliner H and the second bracket 200 extends through the opening O in the headliner H in the manner illustrated in FIG. 1. More specifically, the fasteners 14*iv*, 14*v* are inserted through the openings 106*iii* in the third leg 102*iii* of the first bracket 100 and through the openings 206*i* in the first leg 202*i* of the second bracket 200 such that each of the fasteners 14 is positioned between the headliner H and the vehicle V, thereby simplifying installation and improving the overall aesthetic appearance of the mounting system 10. The accessory A can then be secured to the mounting system 10 via connection of the accessory A to the end region 208 (FIG. 2) of the fourth leg 202*iv* of the second bracket 200 and connection of the support(s) S to the pivot member 12.

Upon deployment of the (curtain) airbag module M, a radial inward force may be applied to the headliner H, which will deflect the headliner H inwardly (i.e., away from the (curtain) airbag module M) in the direction indicated by arrow 1 in FIG. 1. During such deflection of the headliner H, the headliner H is allowed to move relative to the mounting system 10, which not only reduces (if not entirely eliminates) resistance to (and interference with) deployment of the (curtain) airbag module M that may otherwise be created by the headliner H, but facilitates less substantial deformation of the headliner H compared to known systems in which movement of the headliner H is restricted. More specifically, upon deployment of the (curtain) airbag module M, by virtue of the inclusion of the opening O, the headliner H moves about the second bracket 200, sliding relative to the first leg 202*i*, the second leg 202*ii*, etc.

With reference now to FIGS. 4-9, various alternate embodiments of the mounting system 10 will be discussed. Each embodiment of the brackets discussed hereinbelow is substantially similar in both structure and function to the aforedescribed brackets 100, 200, 300 and, accordingly, will only be discussed with respect to any differences therefrom in the interest of brevity.

Figure 4:
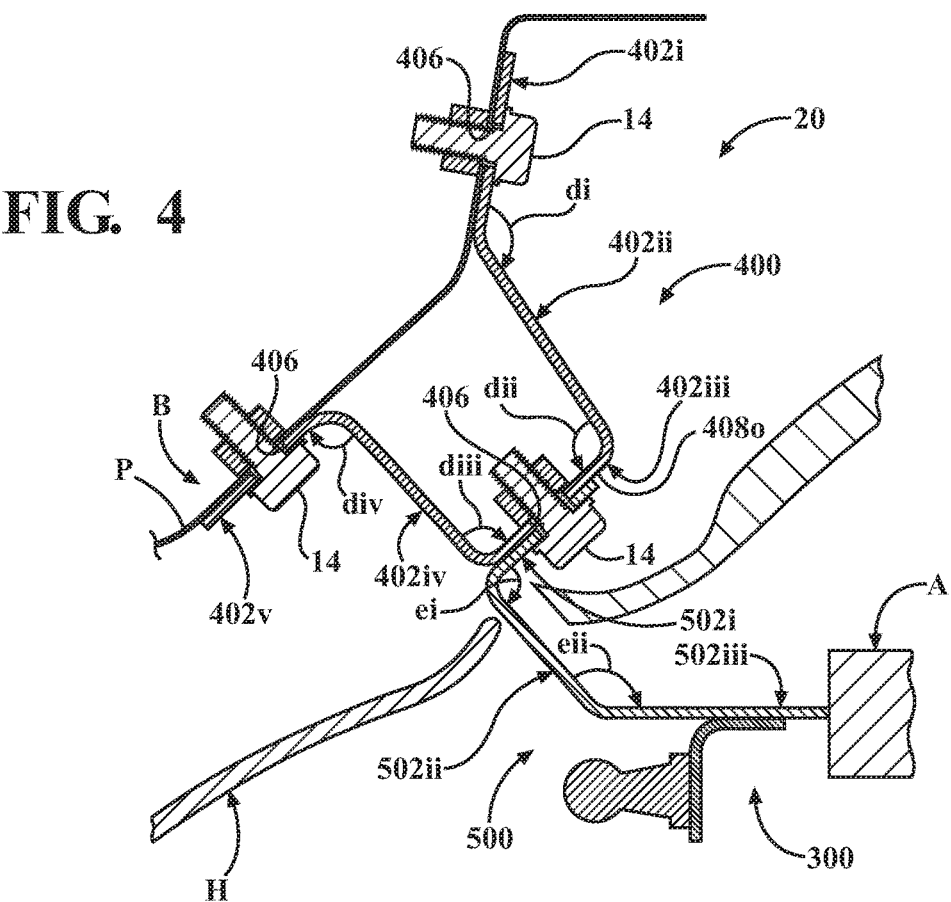
FIG. 4 is a schematic view of the accessory shown mounted within the vehicle via an alternate embodiment of the mounting system.

FIG. 4 illustrates a mounting system 20 that includes a first bracket 400, a second bracket 500, and the (aforedescribed) third bracket 300. The first bracket 400 includes a first leg 402*i*; a second leg 402*ii* that extends from the first leg 402*i* so as to define a first (obtuse) angle d*i*; a third leg 402*iii* that extends from the second leg 402*ii* so as to define a second angle d*ii*; a fourth leg 402*iv* that extends from the third leg 402*iii* so as to define a third angle d*iii*; and a fifth leg 402*v* that extends from the fourth leg 402*iv* so as to define a fourth angle d*iv*. In the illustrated embodiment, the first bracket 400 is configured such that the first angle d*i* lies substantially within the range of approximately 110° to approximately 160° (e.g., approximately) 135° and the respective second, third, and fourth angles d*ii*, d*iii*, d*iv* each lie substantially within the range of approximately 70° to approximately 110° (e.g., approximately 90°). As such, in the illustrated embodiment, the third leg 402*iii* extends transversely (e.g., generally orthogonally) in relation to each of the respective second and fourth legs 402*ii*, 402*iv* and the respective second and fourth legs 402*ii*, 402*iv* extend in generally parallel relation such that the first bracket 400 includes a generally omega-shaped configuration. Embodiments are thus envisioned in which the angles d*ii*, d*iii*, d*iv* are identical (or substantially similar), as illustrated in FIG. 4. It should be appreciated, however, that the particular configuration of the first bracket 400 and the relative orientations of the legs 402*i*-402*v* may be varied in alternate embodiments without departing from the scope of the present disclosure (e.g., depending upon the particular configuration of the accessory A, the particular model or style of the vehicle V, etc.). As such, embodiments in which the angles d*i*-d*iv* may lie outside the ranges identified are also envisioned herein.

Each of the legs 402*i*-402*v* is generally linear in configuration, and the legs 402*i*, 402*iii*, 402*v* include one or more openings 406 that are configured to receive mechanical fasteners 14 so as to fixedly connect the first bracket 400 to the vehicle V (e.g., to the body panel B) and fixedly connect the second bracket 500 to the first bracket 400 in the manner discussed above.

As seen in FIG. 4, the first bracket 400 is configured such that the first bracket 400 and each of the mechanical fasteners 14 are entirely concealed by the headliner H, as discussed above with respect to the mounting system 10.

The second bracket 500 includes a first leg 502*i*; a second leg 502*ii* that extends from the first leg 502*i* so as to define a first angle e*i*; and a third leg 502*iii* that supports the third bracket 300 and extends from the second leg 502*ii* so as to define a second (obtuse) angle e*ii*. As seen in FIG. 4, the first leg 502*i* of the second bracket 500 is superimposed on an outer surface 408*o* of the third leg 402*iii* of the first bracket 400 to facilitate connection of the brackets 400, 500 via the mechanical fastener(s) 14 in the manner discussed above.

In the illustrated embodiment, the second bracket 500 is configured such that the first angle ei lies substantially within the range of approximately 70° to approximately 110° (e.g., approximately 90°), whereby the second leg 502*ii* extends transversely (e.g., generally orthogonally) in relation to the first leg 502*i*, and the second angle eii lies substantially within the range of approximately 110° to approximately 160° (e.g., approximately 135°). It should be appreciated, however, that the particular configuration of the second bracket 500 and the relative orientations of the legs 502*i*-502*iii* may be varied in alternate embodiments without departing from the scope of the present disclosure (e.g., depending upon the particular configuration of the accessory A, the particular model or style of the vehicle V, etc.). As such, embodiments in which the angles ei, eii may lie outside the ranges identified are also envisioned herein.

Figure 5:
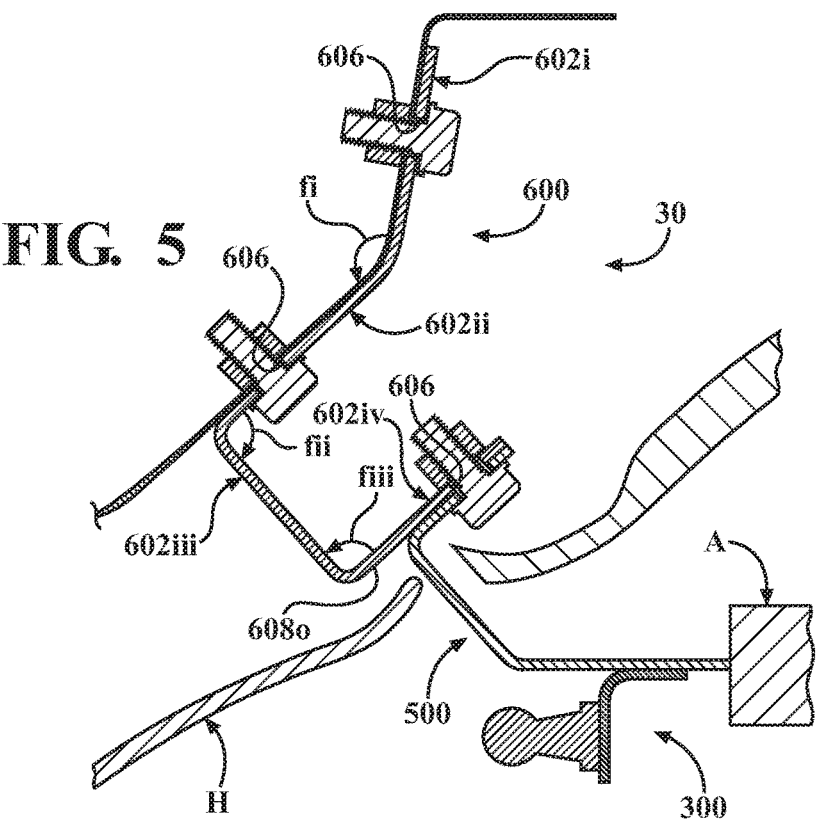
FIG. 5 is a schematic view of the accessory shown mounted within the vehicle via an alternate embodiment of the mounting system.

With reference now to FIG. 5, a mounting system 30 is illustrated that includes a first bracket 600 and the (aforedescribed) second and third brackets 500, 300, respectively. The first bracket 600 includes a first leg 602*i*; a second leg 602*ii* that extends from the first leg 602*i* so as to define a first (obtuse) angle fi; a third leg 602*iii* that extends from the second leg 602*ii* so as to define a second angle fii; and a fourth leg 602*iv* that extends from the third leg 602*iii* so as to define a third angle fiii. In the illustrated embodiment, the first bracket 600 is configured such that the first angle fi lies substantially within the range of approximately 110° to approximately 160° (e.g., approximately 135°) and the respective second and third angles fi, fii each lie substantially within the range of approximately 70° to approximately 110° (e.g., approximately 90°, whereby the third leg 602*iii* extends transversely (e.g., generally orthogonally) in relation to each of the respective second and fourth legs 602*ii*, 602*iv* and the respective second and fourth legs 602*ii*, 602*iv* extend in generally parallel relation such that the first bracket 600 includes a generally ladle- or spoon-shaped configuration. As such, embodiments in which the angles fi, fii are identical (or substantially similar) are envisioned herein, as illustrated in FIG. 5. It should be appreciated, however, that the particular configuration of the first bracket 600 and the relative orientations of the legs 602*i*-602*iv* may be varied in alternate embodiments without departing from the scope of the present disclosure (e.g., depending upon the particular configuration of the accessory A, the particular model or style of the vehicle V, etc.). As such, embodiments in which the angles fi-fiii may lie outside the ranges identified are also envisioned herein.

Each of the legs 602*i*-602*iv* is generally linear in configuration, and the legs 602*i*, 602*ii* include one or more openings 606 that are configured to receive the mechanical fasteners 14 so as to fixedly connect the first bracket 600 to the vehicle V in the manner discussed above.

Additionally, the leg 602*iv* supports the second bracket 500 such that the second bracket 500 is superimposed on an outer surface 608*o* of the fourth leg 602*iv* of the first bracket 600. More specifically, the leg 602*iv* includes one or more openings 606 that are configured to receive the mechanical fasteners 14 extending through the second bracket 500 so as to fixedly connect the brackets 600, 500 together.

As seen in FIG. 5, the first bracket 600 is again configured such that the first bracket 600 and each of the mechanical fasteners 14 is entirely concealed by the headliner H, as discussed above with respect to the mounting systems 10, 20.

Figure 6:
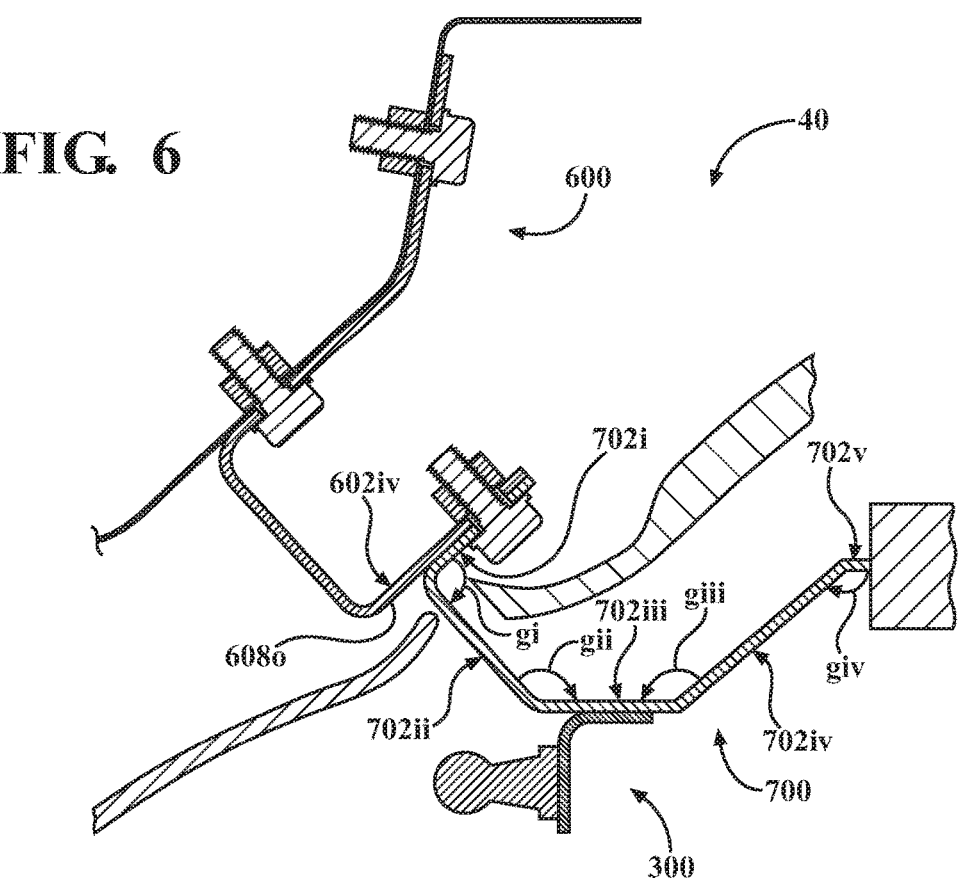
FIG. 6 is a schematic view of the accessory shown mounted within the vehicle via an alternate embodiment of the mounting system.

With reference now to FIG. 6, a mounting system 40 is illustrated that includes the (aforedescribed) first bracket 600, a second bracket 700, and the (aforedescribed) third bracket 300. In contrast to the second bracket 500 (FIGS. 4, 5), the second bracket 700 includes a first leg 702*i* that is superimposed on the outer surface 608*o* of the fourth leg 602*iv* of the first bracket 600; a second leg 702*ii* that extends from the first leg 702*i* so as to define a first angle gi; a third leg 702*iii* that supports the third bracket 300 and extends from the second leg 702*ii* so as to define a second (obtuse) angle gii; a fourth leg 702*iv* that extends from the third leg 702*iii* so as to define a third (obtuse) angle giii; and a fifth leg 702*v* that extends from the fourth leg 702*iv* so as to define a fourth (obtuse) angle giv. In the illustrated embodiment, the second bracket 700 is configured such that the first angle gi lies substantially within the range of approximately 70° to approximately 110° (e.g., approximately 90°), whereby the second leg 702*ii* extends transversely (e.g., generally orthogonally) in relation to the first leg 702*i*, and the respective second, third, and fourth angles gii, giii, giv each lie substantially within the range of approximately 110° to approximately 160° (e.g., approximately 135°), whereby the respective third and fifth legs 702*iii*, 702*v* extend in generally parallel relation, which allows for use of the mounting system 40 without any adjustments to (reconfiguration of) the accessory A. As such, embodiments in which the angles gii, giii, giv are identical (or substantially similar) are envisioned herein, as illustrated in FIG. 6. It should be appreciated, however, that the particular configuration of the second bracket 700 and the relative orientations of the legs 702*i*-702*v* may be varied in alternate embodiments without departing from the scope of the present disclosure (e.g., depending upon the particular configuration of the accessory A, the particular model or style of the vehicle V, etc.). As such, embodiments in which the angles gi-giv may lie outside the ranges identified are also envisioned herein.

Figure 7:
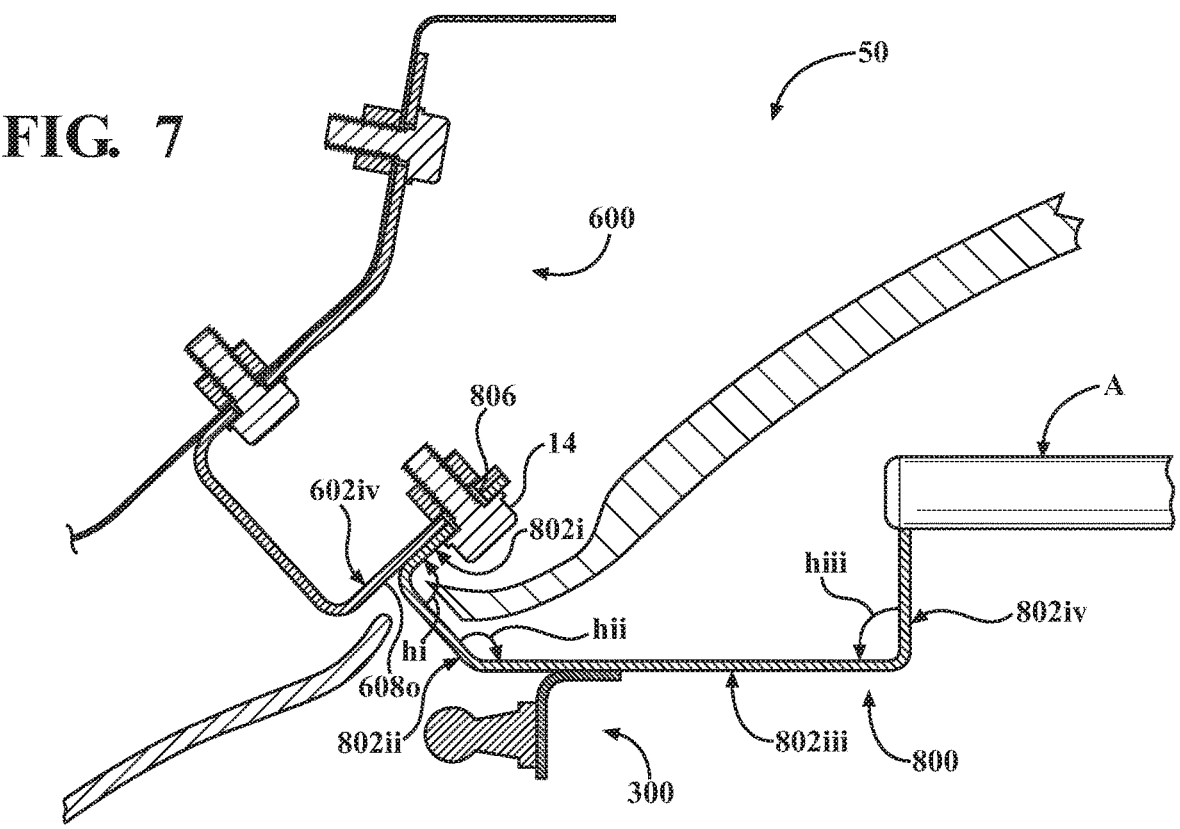
FIG. 7 is a schematic view of the accessory shown mounted within the vehicle via an alternate embodiment of the mounting system.

With reference now to FIG. 7, a mounting system 50 is illustrated that includes the (aforedescribed) first and third brackets 600, 300, respectively, and a second bracket 800. The second bracket 800 includes a first leg 802*i* that is superimposed on the outer surface 608*o* of the fourth leg 602*iv* of the first bracket 600; a second leg 802*ii* that extends from the first leg 802*i* so as to define a first angle hi; a third leg 802*iii* that supports the third bracket 300 and extends from the second leg 802*ii* so as to define a second (obtuse) angle hii; and a fourth leg 802*iv* that extends from the third leg 802*iii* so as to define a third angle hiii. In the illustrated embodiment, the second bracket 800 is configured such that the respective first and third angles hi, hiii each lie substantially within the range of approximately 70° to approximately 110° (e.g., approximately) 90°, whereby the second leg 802*ii* extends transversely (e.g., generally orthogonally) in relation to the first leg 802*i* and the fourth leg 802*iv* extends transversely (e.g., generally orthogonally) in relation to the third leg 802*iii*. As such, embodiments in which the angles hi, hiii are identical (or substantially similar) are envisioned herein, as illustrated in FIG. 7. Additionally, the second bracket 800 is configured such that the second angle hii lies substantially within the range of approximately 110° to approximately 160° (e.g., approximately 135°), which allows for use of the mounting system 50 without any adjustments to (reconfiguration of) the accessory A. It should be appreciated, however, that the particular configuration of the second bracket 800 and the relative orientations of the legs 802i-802iv may be varied in alternate embodiments without departing from the scope of the present disclosure (e.g., depending upon the particular configuration of the accessory A, the particular model or style of the vehicle V, etc.). As such, embodiments in which the angles hi-hiii may lie outside the ranges identified are also envisioned herein.

Each of the legs 802i-802iv is generally linear in configuration, and the leg 802i includes one or more openings 806 that are configured to receive the mechanical fasteners 14 extending through the first bracket 600 so as to fixedly connect the brackets 600, 800 together in the manner discussed above.

Figure 8:
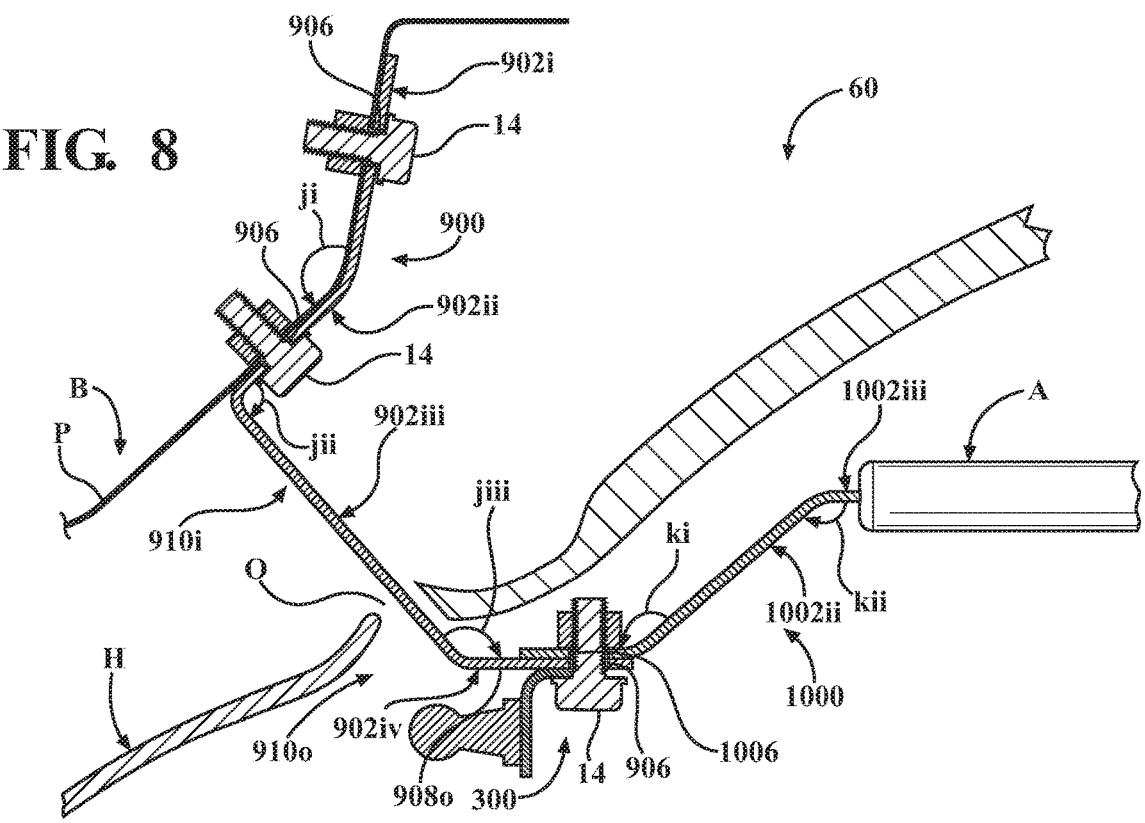
FIG. 8 is a schematic view of the accessory shown mounted within the vehicle via an alternate embodiment of the mounting system.

FIG. 8 illustrates a mounting system 60 that includes a first bracket 900, a second bracket 1000, and the (aforedescribed) third bracket 300. The first bracket 900 includes a first leg 902i; a second leg 902ii that extends from the first leg 902i so as to define a first (obtuse) angle ji; a third leg 902iii that extends from the second leg 902ii so as to define a second angle jii; and a fourth leg 902iv that supports the third bracket 300 and extends from the third leg 902iii so as to define a third (obtuse) angle jiii. In the illustrated embodiment, the first bracket 900 is configured such that the respective first and third angles ji, jiii each lie substantially within the range of approximately 110° to approximately 160° (e.g., approximately 135°) and the second angle jii lies substantially within the range of approximately 70° to approximately 110° (e.g., approximately 90°), whereby the third leg 902iii extends transversely (e.g., generally orthogonally) in relation to the second leg 902ii. As such, embodiments in which the angles ji, jiii are identical (or substantially similar) are envisioned herein, as illustrated in FIG. 8. It should be appreciated, however, that the particular configuration of the first bracket 900 and the relative orientations of the legs 902i-902iv may be varied in alternate embodiments without departing from the scope of the present disclosure (e.g., depending upon the particular configuration of the accessory A, the particular model or style of the vehicle V, etc.). As such, embodiments in which the angles ji-jiii may lie outside the ranges identified are also envisioned herein.

Each of the legs 902i-902iv is generally linear in configuration, and the legs 902i, 902ii include one or more openings 906 that are configured to receive the mechanical fasteners 14 so as to fixedly connect the first bracket 900 to the body panel B of the vehicle V (e.g., to the rear pillar P) in the manner discussed above. Additionally, the leg 902iv includes one or more openings 906 that are configured to receive the mechanical fasteners 14, which extend through the second bracket 1000, as described in further detail below, so as to fixedly connect the brackets 900, 1000 together.

In contrast to each of the aforedescribed embodiments, as seen in FIG. 8, the first bracket 900 extends through the opening O in the headliner H. More specifically, the third leg 902iii of the first bracket 900 extends through the opening O such that a first (inner) section 910i of the third leg 902iii is concealed by the headliner H and a second (outer) section 910o of the third leg 902iii is exposed from (visible through) the headliner H.

The second bracket 1000 includes a first leg 1002i that is superimposed on an inner surface 908i of the fourth leg 902iv of the first bracket 900; a second leg 1002ii that extends from the first leg 1002i so as to define a first (obtuse) angle ki; and a third leg 1002iii that extends from the second leg 1002ii so as to define a second (obtuse) angle kii. In the illustrated embodiment, the second bracket 1000 is configured such that each of the angles ki, kii lies substantially within the range of approximately 110° to approximately 160° (e.g., approximately) 135°, whereby the respective first and third legs 1002i, 1002iii extend in generally parallel relation, which allows for use of the mounting system 60 without any adjustments to (reconfiguration of) the accessory A. It should be appreciated, however, that the particular configuration of the second bracket 1000 and the relative orientations of the legs 1002i-1002iii may be varied in alternate embodiments without departing from the scope of the present disclosure (e.g., depending upon the particular configuration of the accessory A, the particular model or style of the vehicle V, etc.). As such, embodiments in which the angles ki, kii may lie outside the ranges identified are also envisioned herein.

As seen in FIG. 8, in the illustrated embodiment, the third bracket 300 is positioned in adjacent, contacting relation to the fourth leg 902iv of the first bracket 900. More specifically, the third bracket 300 is superimposed on an outer surface 908o of the fourth leg 902iv and is fixedly connected thereto by the mechanical fastener(s) 14 that extend through the third bracket 300, the fourth leg 902iv of the first bracket 900, and opening(s) 1006 in the first leg 1002i of the second bracket 1000.

Figure 9:
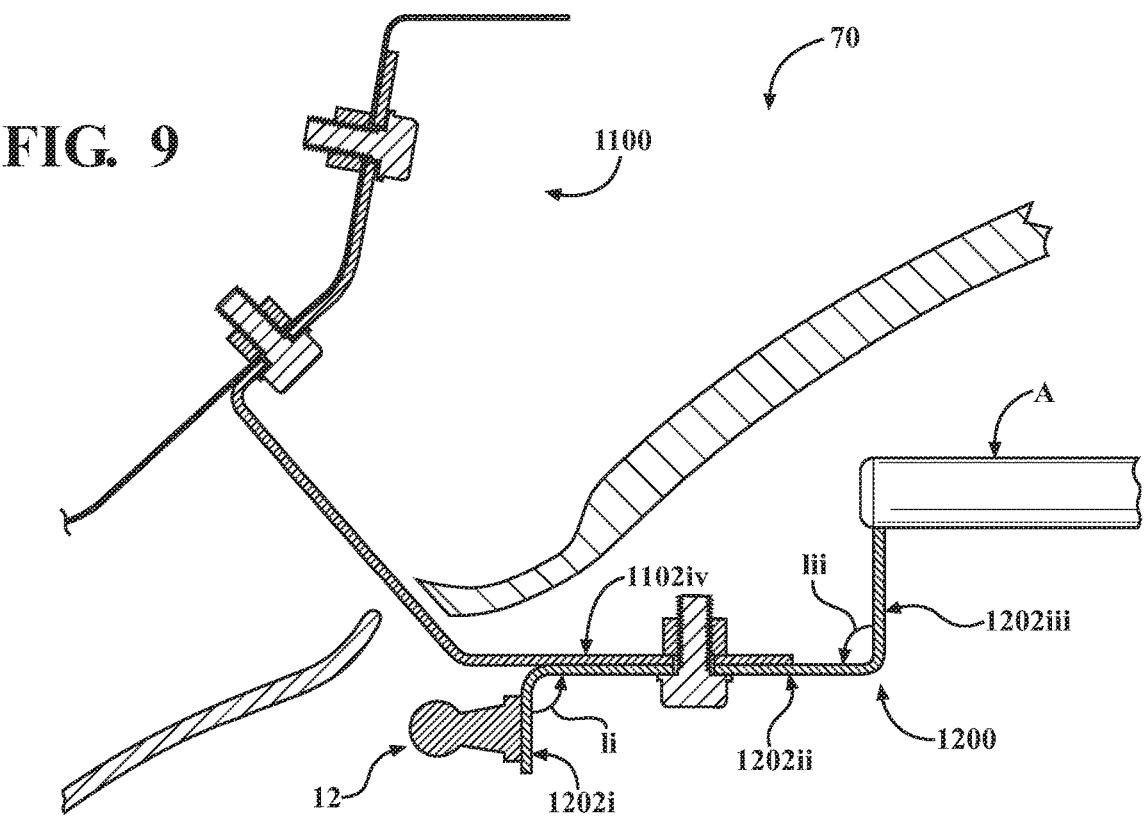
FIG. 9 is a schematic view of the accessory shown mounted within the vehicle via an alternate embodiment of the mounting system.

With reference now to FIG. 9, a mounting system 70 is illustrated that includes a first bracket 1100 and a second bracket 1200. The first bracket 1100 is substantially similar to the first bracket 900 discussed above with respect to FIG. 8, but for the configuration of the fourth leg 902iv. More specifically, the first bracket 1100 includes a fourth leg 1102iv that is elongated (relative to the fourth leg 902iv of the first bracket 900), which allows, for example, for increased surface contact between the brackets 1100, 1200.

The second bracket 1200 includes a first leg 1202i that supports the pivot member 12, thereby obviating the need for the aforedescribed third bracket 300; a second leg 1202ii that extends from the first leg 1202i so as to define a first angle li; and a third leg 1202iii that extends from the second leg 1202ii so as to define a second angle lii. In the illustrated embodiment, the second bracket 1200 is configured such that each of the angles li, lii lies substantially within the range of approximately 70° to approximately 110° (e.g., approximately 90°), whereby the second leg 1202ii extends transversely (e.g., generally orthogonally) in relation to each of the respective first and third legs 1202i, 1202iii and the respective first and third legs 1202i, 1202iii extend in generally parallel relation. The second bracket 1200 is thus generally S-shaped in configuration, which allows for use of the mounting system 70 without any adjustments to (reconfiguration of) the accessory A. It should be appreciated, however, that the particular configuration of the second bracket 1200 and the relative orientations of the legs 1202i-1202iii may be varied in alternate embodiments without departing from the scope of the present disclosure (e.g., depending upon the particular configuration of the accessory A, the particular model or style of the vehicle V, etc.). As such, embodiments in which the angles li, lii may lie outside the ranges identified are also envisioned herein.

To increase structural rigidity, it is envisioned that any of the brackets 100-1200 described hereinabove may include one or more reinforcing members (e.g., ribs, flanges, or the like). In such embodiments, it is envisioned that the reinforcing members may be positioned in any suitable locations, such as, for example, at or adjacent to perimeter sections of the bracket(s) 100-1200.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
    an accessory separating a cargo area from a passenger seating area; and
    a mounting system configured to support the accessory, the mounting system including:
        a first bracket secured to a body panel of the vehicle, the first bracket being positioned between the body panel of the vehicle and a headliner of the vehicle such that the first bracket is concealed by the headliner; and
        a second bracket connected to the first bracket, the second bracket being configured for connection to the accessory and extending through an opening in the headliner such that a first section of the second bracket is concealed by the headliner and a second section of the second bracket is exposed from the headliner, whereby the headliner is movable relative to and about the second bracket upon deployment of an airbag so as to reduce interference with deployment of the airbag.

2. The vehicle of claim 1, wherein the second bracket is superimposed on the first bracket.

3. The vehicle of claim 2, wherein the first bracket includes a first leg and a second leg extending from the first leg in generally orthogonal relation.

4. The vehicle of claim 3, wherein the first bracket is generally L-shaped in configuration.

5. The vehicle of claim 3, wherein the first bracket further includes a third leg extending from the second leg in generally orthogonal relation.

6. The vehicle of claim 5, wherein the second bracket is connected to the second leg of the first bracket.

7. The vehicle of claim 5, wherein the second bracket is connected to the third leg of the first bracket.

8. The vehicle of claim 3, wherein the second bracket includes:
    a first leg;
    a second leg extending from the first leg at a first obtuse angle;
    a third leg extending from the second leg at a second obtuse angle; and
    a fourth leg extending from the third leg at a third obtuse angle.

9. The vehicle of claim 8, wherein the fourth leg includes a forked end configured for connection to the accessory.

10. The vehicle of claim 8, wherein the second bracket is configured to support a pivot member to allow for pivotable movement of the accessory relative to the mounting system.

11. The vehicle of claim 10, wherein the second bracket further includes a flange extending from the second leg, the pivot member being connected to the flange.

12. The vehicle of claim 10, wherein the mounting system further includes a third bracket secured to the second leg of the second bracket, the pivot member being connected to the third bracket.

13. A vehicle comprising:
    an accessory separating a cargo area from a passenger seating area; and
    a mounting system configured to support the accessory, the mounting system including:
        a first bracket secured to a body panel of the vehicle such that the first bracket is positioned between the body panel of the vehicle and a headliner of the vehicle, the first bracket extending through an opening in the headliner such that the headliner is movable relative to and about the first bracket upon deployment of an airbag so as to reduce interference with deployment of the airbag, the first bracket including:
- a first leg;
- a second leg extending from the first leg in generally orthogonal relation; and
- a third leg extending from the second leg at an obtuse angle; and a second bracket connected to the first bracket, the second bracket being configured for connection to the accessory and including:
- a first leg;
- a second leg extending from the first leg; and
- a third leg extending from the second leg.

14. The vehicle of claim 13, wherein the first leg of the second bracket is connected to the third leg of the first bracket.

15. The vehicle of claim 14, wherein the second leg of the second bracket extends from the first leg of the second bracket at a first obtuse angle and the third leg of the second bracket extends from the second leg of the second bracket at a second obtuse angle.

16. The vehicle of claim 13, wherein the second leg of the second bracket is connected to the third leg of the first bracket.

17. The vehicle of claim 16, wherein the second leg of the second bracket extends in generally orthogonal relation to each of the first leg of the second bracket and the third leg of the second bracket.

18. A method of connecting an accessory to a vehicle such that the accessory separates a cargo area from a passenger seating area, the method comprising:

connecting a first bracket to a body panel of the vehicle such that the first bracket is concealed by a headliner of the vehicle;

connecting a second bracket to the first bracket such that the second bracket extends through an opening in the headliner, whereby the headliner is movable relative to and about the second bracket upon deployment of an airbag so as to reduce interference with deployment of the airbag; and connecting the accessory to the second bracket.

19. The method of claim 18, wherein connecting the second bracket to the first bracket includes connecting a first leg of the second bracket to a second leg of the first bracket, the first and second legs of the first bracket extending in generally orthogonal relation such that the first bracket is generally L-shaped in configuration.

20. The method of claim 18, wherein connecting the second bracket to the first bracket includes connecting the second bracket to a second leg or to a third leg of the first bracket, the second leg extending from a first leg in generally orthogonal relation and the third leg extending from the second leg in generally orthogonal relation.

* * * * *